United States Patent [19]

Turner, Jr. et al.

[11] Patent Number: 4,547,120
[45] Date of Patent: Oct. 15, 1985

[54] MANIPULATOR ROBOT

[75] Inventors: Herman E. Turner, Jr., Elyria; Jan L. Shanaberger, Avon Lake, both of Ohio

[73] Assignee: Nordson Corporation, Amherst, Ohio

[21] Appl. No.: 539,923

[22] Filed: Oct. 7, 1983

[51] Int. Cl.⁴ ............................................. B25J 9/00
[52] U.S. Cl. .................. 414/744 R; 901/22; 901/50; 414/735
[58] Field of Search ............... 901/9, 43, 22, 24, 50; 414/730, 735, 744 R

[56] References Cited

U.S. PATENT DOCUMENTS

| | | | |
|---|---|---|---|
| 4,015,721 | 4/1977 | Scheler | 901/9 X |
| 4,218,166 | 8/1980 | Abu-Akeel et al. | 901/50 X |
| 4,239,431 | 12/1980 | Dauini | 901/9 X |
| 4,378,959 | 4/1983 | Susnjara | 901/22 X |

*Primary Examiner*—Terrance L. Siemens
*Attorney, Agent, or Firm*—Wood, Herron & Evans

[57] ABSTRACT

A work-performing manipulator robot having a base, a turret rotatable on the base about a vertical axis, a vertical arm rotatably mounted on the turret for rotation about a horizontal axis at a shoulder joint, and a horizontal arm rotatably mounted on the vertical arm for rotation about a horizontal axis at an elbow joint. The mounting of and angular position transducer for the turret/base joint is such that electrical cables and hydraulic fluid hoses can be coupled through apertures in the turret and the base to a channel in the vertical arm. The vertical arm is driven by a cylinder/piston assembly wherein the cylinder is pivotally attached to the vertical arm and the rod is pivotally attached to the turret, reducing the relative travel between the cylinder and the vertical arm. A servo valve for each of the armactuating cylinders is mounted on the side of the vertical arm and pivotally attached to the arm about the same pivot point as the associated cylinder so that the servo valve and the cylinder may be coupled together by rigid fluid conduits without relative movement between the servo valve and the cylinder.

5 Claims, 7 Drawing Figures

MANIPULATOR ROBOT

DESCRIPTION OF THE INVENTION

This invention relates generally to work-performing robots and more particularly concerns a work-performing robot driven by linear actuators.

A work-performing robot, or manipulator, typically includes a plurality of links interconnected to provide relative motion with a plurality of degrees of freedom. The links are each provided with a signal-controlled actuator for powering the respective links, as well as a position transducer for providing a real-time signal correlated to the actual position of the robot link. In order to provide the actuator control signals, a sequence of command positions for each link is stored in a suitable memory device, and the command positions are periodically retrieved and compared against the actual link position signals provided by the link position transducers. In response to the comparisons, link positional error signals are generated for each of the links and then input to the various link actuators. Therefore, closed loop servo techniques are utilized to drive the various link actuators to move the links to the desired command positions.

There are many applications for work robots, such as welding and the application of various types of coating materials. For example, the present invention shall be disclosed with regard to a work-performing robot which may be used for spray painting. A program comprising sequences of command positions for the robot links is produced in order to effect the movement of the robot for the spraying of paint onto articles to be painted. Production of the prerecorded motion sequence of command positions, known as robot training or teaching, can be accomplished in several ways. In one approach, for example, a lightweight training robot, or simulator, is used to produce a program sequence with an operator moving the simulator through a sequence of motions which it is desired to have the work robot subsequently execute.

The link actuators for the work robot may be linear actuators coupled between adjacent links. As shall be described herein with regard to a particular embodiment of the invention, such a linear actuator may take the form of a hydraulic cylinder pivotally attached to one link, having a hydraulically driven piston rod, movable relative to the cylinder, pivotally attached to an adjacent link. The adjacent links are rotatably attached to a common joint and move relative to one another about an axis at the joint as the piston rod is extended from, and retracted into, the hydraulic cylinder.

The link position transducers may take the form of angular position transducers located at the manipulator robot joints. In the illustrated embodiment of the invention, such an angular position transducer, or resolver, has a housing attached to one of the links at the joint and a shaft rotatable within the resolver housing coupled to the other link at the joint.

Each of the hydraulic cylinders of the linear actuators has an associated servo-controlled valve for controlling the flow of hydraulic fluid to the cylinder in response to the actuator control signals. Therefore, each hydraulic cylinder is coupled through a servo valve to a source of pressurized hydraulic fluid, and the servo valve is coupled by electrical conductors to a programmable controller providing the actuator control signals. In addition, each of the resolvers is coupled by electrical conductors to the controller to provide the actual link position signals to the controller. Such electrical and hydraulic lines are provided for each of the joints of the work-performing robot.

It has been a problem in the past to provide all of the cables and hoses necessary for the actuators and position transducers of a work robot without having exposed portions of such cables and hoses. A work robot, of the general form of that to be described, includes a three axis wrist assembly carrying a suitable tool such as a spray gun mounted at the free end of a horizontal arm, which is rotatably attached at its other end at an elbow joint to a vertical arm. The vertical arm is in turn rotatably attached at a shoulder joint to a turret, which is rotatably received on a base.

In the past, the requisite cables and hoses have been coupled along the vertical and horizontal arms terminating at the appropriate resolver and actuator locations. Some of the cables and hoses, of course, extend along the arms to the wrist assembly to accommodate the three axes of movement of the wrist. In some prior work robots of this general configuration, cables and hoses are exposed about the base of the robot and may rest upon the base. In some cases, the cables and hoses are exposed in the vicinity of the joints, such as the elbow joint.

Consequently, it is one general aim of the invention to provide a work-performing robot of the aforementioned general character in which the requisite cables and hoses are substantially unexposed.

This is accomplished in part by the provision of a vertical arm having a dual web I-beam construction, which provides a channel in the vertical arm for the placement of cables and hoses.

In the illustrated form of the invention, the turret is driven relative to the base by a linear actuator, and the angular position of the turret relative to the base is determined by an angular position transducer, or resolver. This resolver is preferably mounted with the resolver shaft substantially in line with the vertical axis of rotation of the turret relative to the base. To further reduce the extent of exposed cables and hoses, it is desirable to couple the cables and hoses into the base and upwardly to the vertical arm. To do this, the cables and hoses are passed through generally coincident central apertures in the turret and the base to the vertical arm. Since the resolver shaft must be coupled to the rotatable turret, any such openings would normally be at least partially blocked by the resolver and a portion of the turret coupled to the resolver. Accordingly, the present invention is predicated in part upon mounting the turret/base resolver in such a fashion as to permit coupling of the cables are hoses from the base of the robot to the vertical arm without interference from the resolver and the resolver mounting assembly.

As indicated earlier, in order to operate the hydraulic cylinders to actuate the vertical and horizontal arms, hydraulic fluid hoses must be coupled to servo valves associated with each of the hydraulic cylinders. The controlled hydraulic fluid from each servo valve to the associated hydraulic cylinder, to control the position of the piston and piston rod in the cylinder, is preferably supplied from the servo valve to the cylinder by rigid tubing rather than flexible hoses. This provides a "stiffer" response by the hydraulic cylinder actuator to the actuator control signals.

Since each of the hydraulic cylinders, actuating the work robot arms, are linear actuators pivotally attached to the arms, there is relative movement between each cylinder and its associated arm. Normally, in order to avoid the use of flexible hydraulic fluid hoses to accommodate this relative motion, the servo valve is physically mounted on the cylinder rather than on an associated arm. This, however, can produce an undesirable profile for the robot or place the servo valve at a position where it may interfere with the operation of the robot.

It is consequently a further object of the invention to provide means for coupling a servo valve to a robot arm hydraulic actuating cylinder using rigid tubing without physically mounting the servo valve on the cylinder.

In the illustrated form of the invention, this is accomplished by mounting the servo valve on the arm to pivot about the same axis as that about which the associated cylinder pivots. In accordance with a further feature of the invention, the length of rigid tubing required to couple the servo valve for the vertical arm actuating cylinder to the cylinder is reduced by pivotally attaching the cylinder to the vertical arm and pivotally attaching the piston rod to the turret.

Other objects and advantages of the invention, and the manner of their implementation, will become apparent upon reading the following detailed description and upon reference to the drawings, in which.

Figure 1:
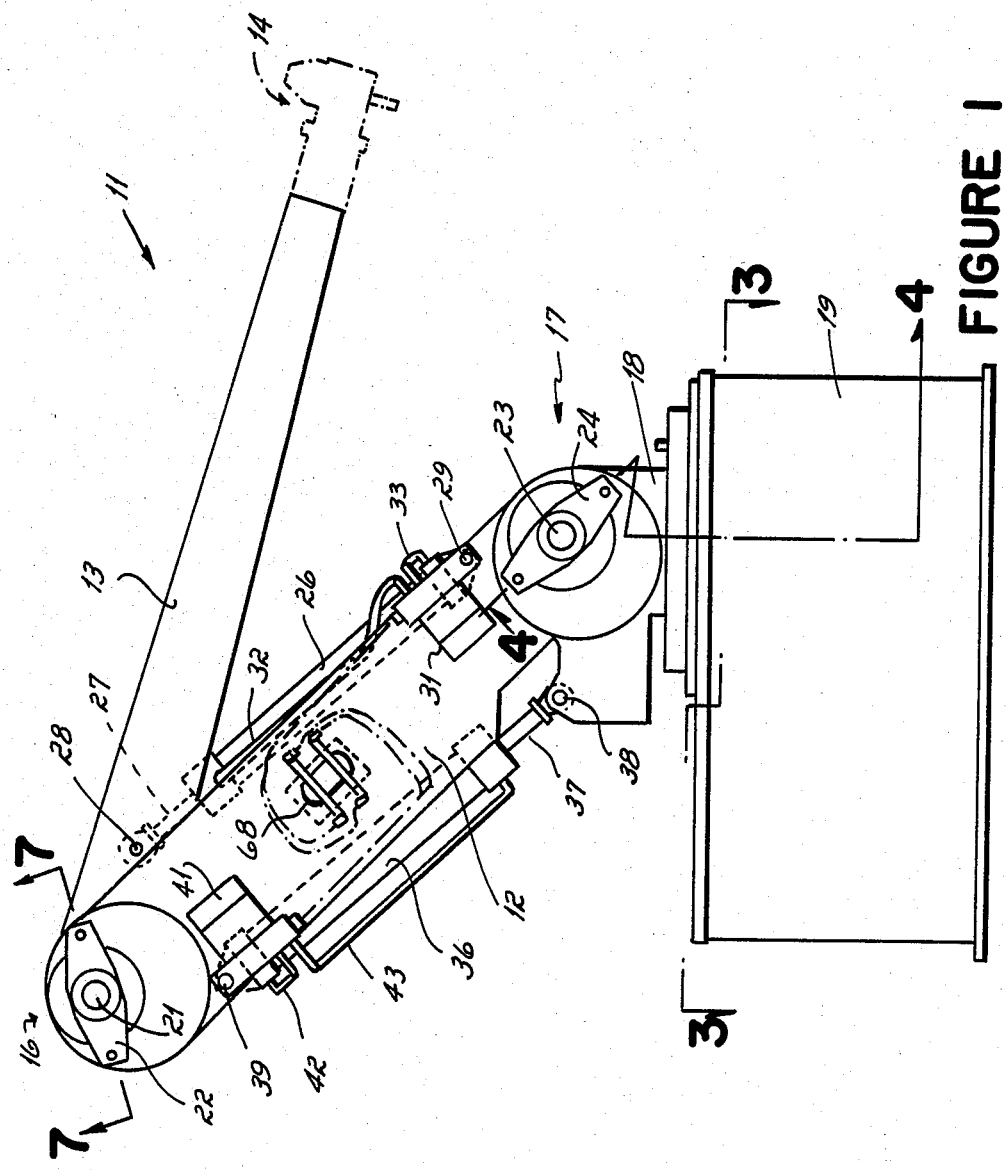
FIG. 1 is a side view of a work-performing robot in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

Turning now to the figures, a work-performing robot 11 includes a first arm 12, designated the vertical arm, and a second arm 13, designated the horizontal arm. A wrist assembly 14 providing, for example, three additional degrees of freedom is mounted at the end of the horizontal arm 13 and is adapted to receive an appropriate tool, such as a spray painting gun or the like. The vertical arm 12 and the horizontal arm 13 are rotatably attached at an elbow joint 16 for rotation about a substantially horizontal axis. The vertical arm 12 is in turn rotatably mounted at a shoulder joint 17 to a turret 18 for rotation about a substantially horizontal axis. The turret 18 is rotatably mounted on a base 19 for rotation about a substantially vertical axis.

Figure 7:
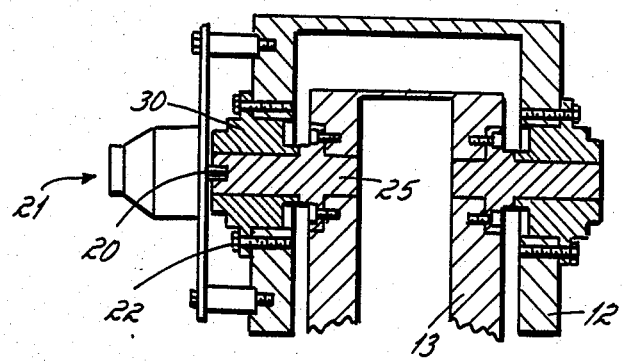
FIG. 7 is a sectional view of the elbow joint between the horizontal and vertical arms of the robot of FIG. 1.

To indicate the angular position of the horizontal arm 13 relative to the vertical arm 12 at the elbow joint 16, a resolver 21 is mounted at the joint. The resolver shaft 20 (FIG. 7) is fixed within an inner bearing support 25, which is rigidly attached to the horiztonal arm 13 and rotates therewith. The resolver housing is attached to a plate 22 which is in turn mounted on the vertical arm 12. The rotation of the horizontal arm 13, therefore, rotates the shaft of the resolver 21 providing an indication of the relative angular position between the two arms. The bearing support 25, to which the resolver shaft 20 is attached, rotates within a flanged roller bearing 30 attached to the vertical arm 12.

A resolver 23 is also mounted at the shoulder joint 17. The resolver shaft 35 (FIG. 4) is attached to a bearing support 40, rotatable within a flanged roller bearing 45, and affixed to the vertical arm 12. The housing of the resolver is attached to a plate 24 mounted on the turret 18. The resolver 23, therefore, provides an indication of the angular position of the vertical arm 12 relative to the turret 18.

A resolver for indicating the angular position of the turret 18 relative to the base 19 is provided inside the base, in a manner to be described in more detail hereinafter.

The horizontal arm 13 is rotated relative to the vertical arm 12 by a hydraulic cylinder 26 and piston rod 27. The rod 27 is pivotally attached to an axle 28 on the horizontal arm 13 and the hydraulic cylinder 26 is pivotally attached to an axle 29 on the vertical arm 12. The movement of the rod 27 into and out of the cylinder 26 is controlled by a servo valve 31. Hydraulic fluid is coupled between the valve 31 and each end of the cylinder 26 by sections of rigid tubing 32, 33.

Figure 5:
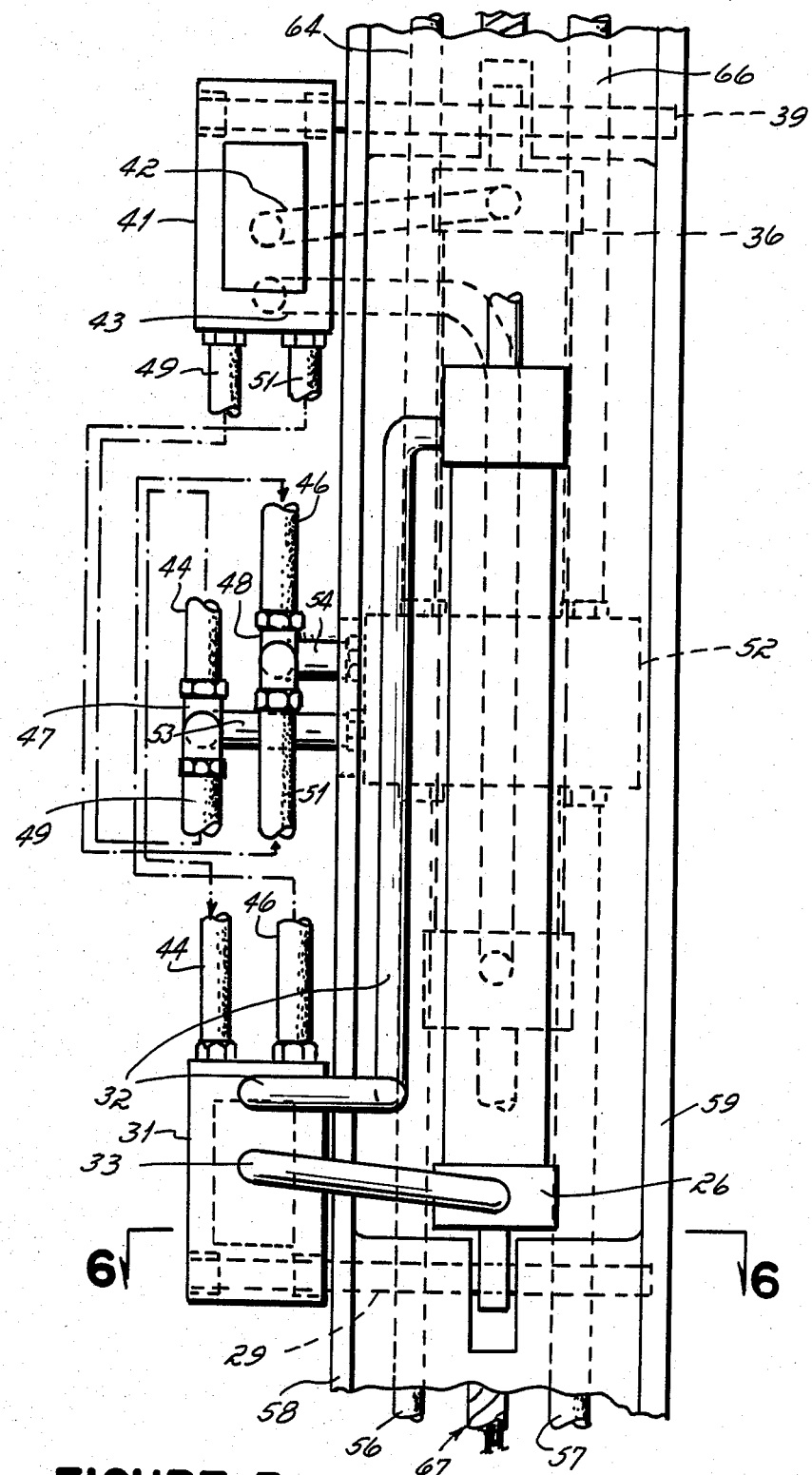
FIG. 5 is an enlarged front view of the robot in its position in FIG. 2, taken along the line 5—5 and in the direction of the arrows.

In accordance with one aspect of the invention, and as best seen in FIG. 5, the servo valve 31 is also pivotally attached to the axle 29 to which the cylinder 26 is pivotally attached. In this way, as the cylinder 26 moves relative to the vertical arm 12, the servo valve 31 moves with the cylinder about the axle 29 under the influence of the rigid tubing 32, 33.

Rotation of the vertical arm 12 relative to the turret 18 is produced by a hydraulic cylinder 36 and piston rod 37 coupled between the turret and the vertical arm. The free end of the piston rod 37 is pivotally attached to an axle 38 on the turret 18. The cylinder 36 is in turn pivotally attached to an axle 39 on the vertical arm 12. In accordance with one feature of the invention, the cylinder 36 and piston rod 37 are mounted in this "inverted" fashion so that the cylinder 36, to which hydraulic lines must be coupled, has significantly less travel relative to the vertical arm 12 than it would if the cylinder and piston rod connections at the axles 38, 39 were reversed.

As in the case of the cylinder 26, the cylinder 36 is coupled to a servo valve 41 by two sections of rigid tubing 42, 43. The servo valve 41 is pivotally attached to the axle 39 about which the cylinder 36 pivots. This avoids relative movement between the servo valve 41 and the cylinder 36 regardless of the orientation between the vertical arm 12 and the cylinder.

Figure 6:
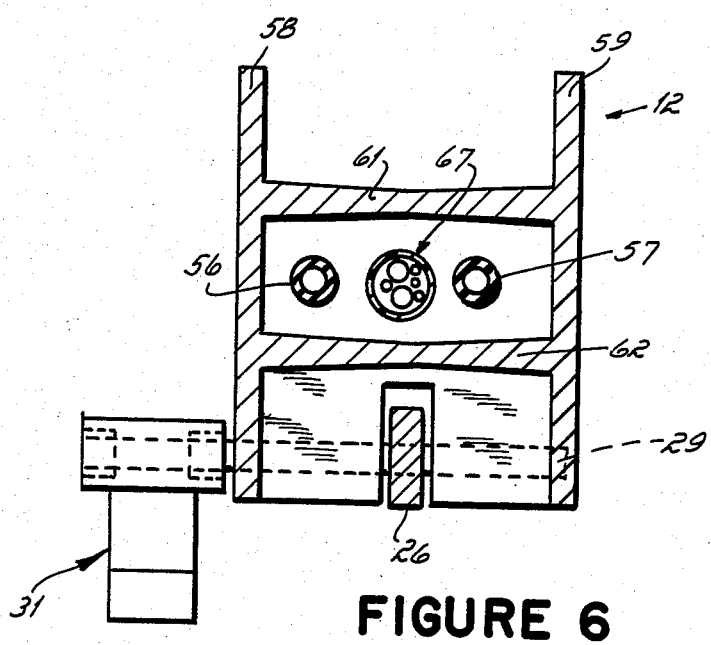
FIG. 6 is a cross sectional view of the vertical arm of the robot taken along the line 6—6 of FIG. 5.

The servo valve 31 is coupled to a hydraulic fluid tank and a hydraulic fluid source through flexible hoses 44, 46. The hoses 44, 46 are received at tee fittings 47, 48 which are likewise coupled to the servo valve 41 through flexible hoses 49, 51. The tee fittings 47, 48 are in turn coupled to a manifold 52 by conduits 53, 54. The manifold 52 is mounted inside the vertical arm 12 and has a tank side and a supply side coupled from a hydraulic fluid tank and source, respectively. The manifold 52 is coupled to the hydraulic fluid tank and supply by flexible hoses 56, 57 (FIGS. 5-6).

In accordance with a further aspect of the invention, the vertical arm 12 is in the form of a double web I-beam having flanges 58, 59 and webs 61, 62. The webs and flanges cooperate to define a channel 63 extending within the vertical arm 12. The hydraulic hoses 56, 57 are conveniently placed in the channel 63 shielding them from the environment of the work robot. As best seen in FIG. 5, further hydraulic fluid hoses 64, 66 extend within the channel 63 upwardly beyond the manifold 52, through the joint 16 and into the horizontal arm 13, to service the wrist assembly actuators.

Figure 2:
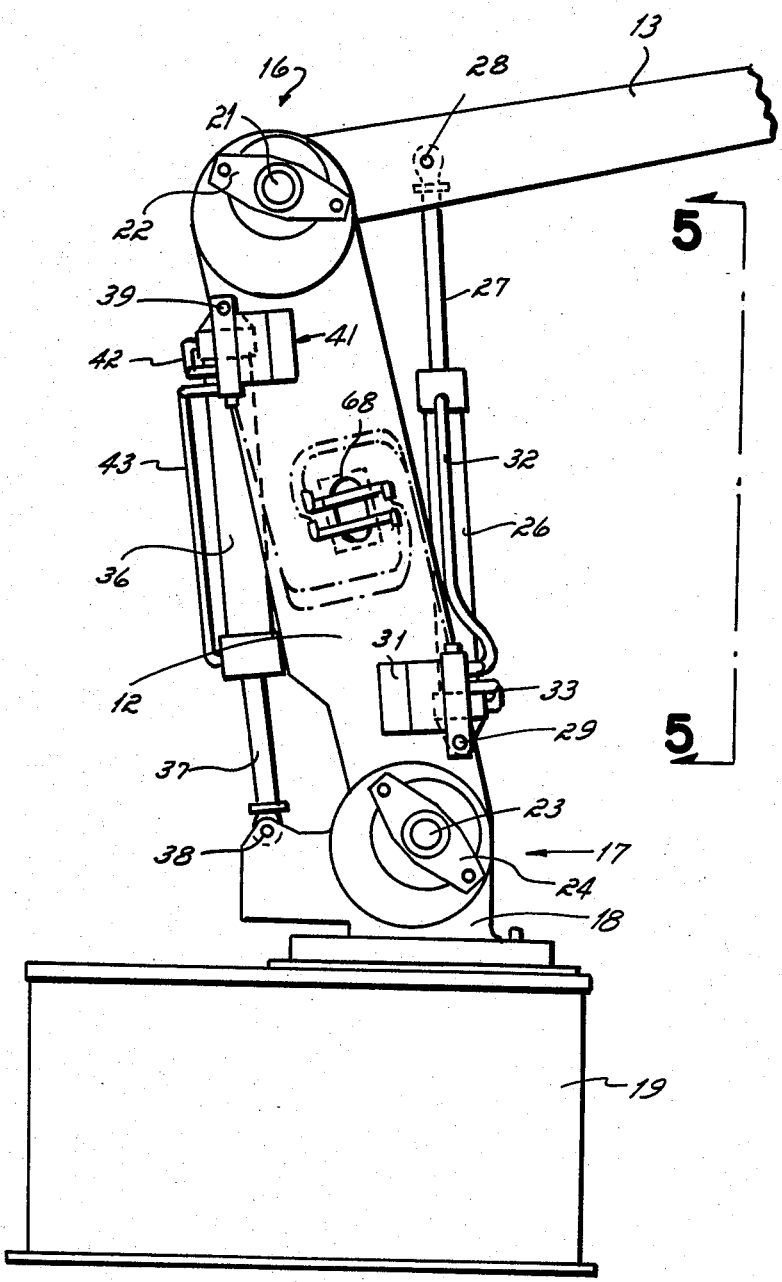
FIG. 2 is a side view of the robot of FIG. 1 with a portion removed, and in a different orientation.

The various resolver and servo valve electrical cables, indicated collectively as 67, are also conveniently located within the channel 63. The requisite electrical conductors are broken out of the cable 67 as needed, such as for the servo valves 31, 41 and the revolvers 21, 23, and the cable continues into the horizontal arm 13. Access to the channel 63 is provided by suitable apertures along the flanges and webs. For example, an aperture 68 (FIG. 2) is provided in the flange 58 of the vertical arm for the conduits 53, 54 leading to the manifold 52.

Advantageously, the hydraulic fluid hoses 56, 57 and electrical conductors 67 are positioned to enter the channel 63 through the interior of the turret 18 from the interior of the base 19. The hoses and conductors are coupled to the base at a desired location about the base from the requisite hydraulic and electrical equipment. Coupling the cables and hoses to the vertical arm is accomplished, in general, by feeding the hoses and cables through central apertures in the turret 18 and the base 19. Sufficient slack is provided in the cables and hoses to accommodate the movement of the robot arms and the rotation of the turret on the base.

Considering the turret/base actuator and resolver assembly in more detail (FIGS. 3-4), the turret 18 is attached to a generally annular inner bearing mount 71 by bolts 72 and a locating pin 73. The turret 18 and bearing mount 71 are rotatably received in an annular outer bearing mount 74, which is attached to the base 19 by bolts 76. The inner bearing mount 71 rotates within the outer bearing mount 74 on ball bearings 77, 78. The ball bearings 77, 78 are retained by rings 79, 81 and a bearing retainer 82. Integrally formed with the bearing retainer 82 is a resolver support bracket portion 83. The housing 86 of a resolver 84 for the turret/base joint is attached to the resolver support 83 so that the shaft 87 of the resolver is substantially aligned with the vertical axis of rotation for the turret 18 relative to the base 19.

The turret 18 is driven relative to the base by a hydraulic cylinder 88 and piston rod 89. The cylinder 88 is pivotally attached to the base at a pivot point 91, and the free end of the rod 89 is pivotally attached to an axle 92 affixed to the inner bearing mount 71. The inner bearing mount 71 includes a downwardly extending arm section 93, which includes a U-shaped portion 94 to accommodate the end of the rod 89 which is received around the axle 92. The axle 92 is secured across the U-shaped portion 94 of the arm 93 by a pair of screws 96, 97.

At the bottom of the arm 93, below the U-shaped portion 94, a generally triangular (FIG. 3) plate portion 98 extends inwardly from the arm 93 to the shaft 87 of the resolver 84. The shaft 87 of the resolver is fixed to the plate 98.

Figure 3:
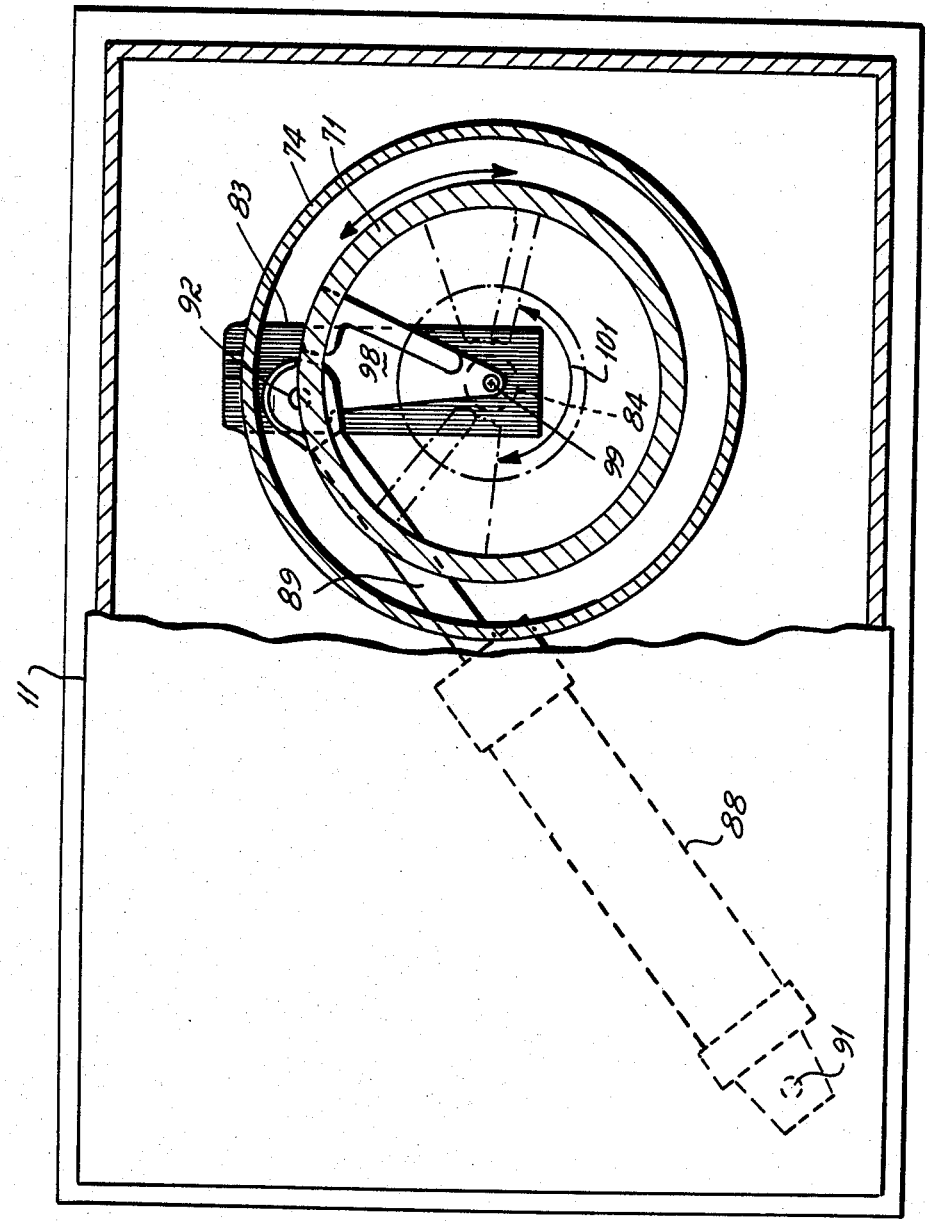
FIG. 3 is a top view, partially in section, of the robot base taken along the line 3—3 of FIG. 1.
Figure 4:
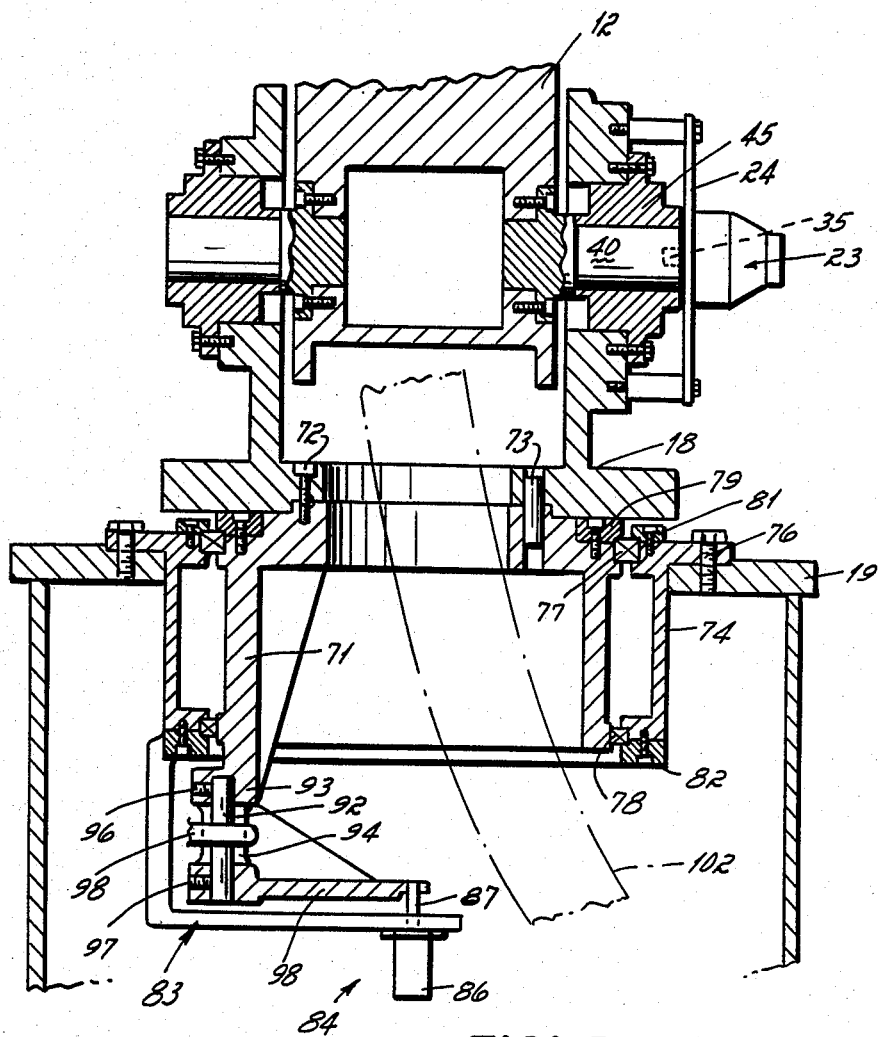
FIG. 4 is a sectional view of the turret and base of the robot taken along the line 4—4 of FIG. 1.

As best seen in FIG. 3, as the rod 89 is moved into and out of the cylinder 88, the turret 18 and inner bearing mount 71 are rotated about the vertical turret/base axis 99. The extremes of travel of the plate 98 coupled to the resolver shaft 87 are generally as shown in phantom in FIG. 3, leaving an accessible service area extending through the arc 101. As shown in FIG. 4, since the resolver 84 is spaced downwardly a considerably distance from the apertures in the turret 18 and the base 19, the hoses such as 56, 57 and conductors 67, shown collectively as a bundle 102, can be introduced easily from a side of the base opposite the plate 98 and fed through the openings in the turret 18 and base 19 to the channel in the vertical arm 12.

What is claimed is:

1. A manipulator robot comprising:
   a generally hollow base having a top surface with an aperture therethrough;
   a turret assembly extending into, and rotatably received on, the base for rotation aboout a generally vertical axis, the turret assembly having an aperture therethrough at least partially coincident with the aperture in the upper surface of the base, said vertical axis passing through both said apertures;
   a first arm rotatably mounted on the turret assembly;
   a second arm rotatably mounted on the first arm;
   an angular position transducer, in line with said vertical axis, having a housing portion and a shaft portion rotatable within the housing portion; and
   means for mounting the angular position transducer inside the base spaced below the apertures in the top surface of the base and the turret assembly, including a first L-shaped support extending downwardly and radially inwardly from the turret assembly to couple one of said transducer portions to the turret assembly and a second L-shaped support extending downwardly and radially inwardly from the base to couple the other said transducer portion to the base, whereby rotation of the turret assembly relative to the base rotates the shaft portion of the transducer relative to the housing portion while permitting the passage of cables or the like above the angular position transducer, adjacent said first and second L-shaped supports, and through both said apertures.

2. The manipulator robot of claim 1 in which the means for mounting the angular position transducer comprises means for mounting the transducer housing portion in a fixed position relative to the base and for coupling transducer shaft portion to the turret assembly.

3. The manipulator robot of claim 1 in which the first arm is in the form of a double web I-beam defining a channel in the first arm and further comprising:
   first actuator means, coupled to an actuator controller by a control cable and coupled to a source of pressurized fluid by a fluid line, coupled between the first arm and the turret assembly for rotating the first arm relative to the turret assembly about a first axis; and
   second actuator means, coupled to an actuator controller by a control cable and coupled to a source of pressurized fluid by a fluid line, coupled between the first arm and the second arm for rotating the second arm relative to the first arm about a second axis, whereby control cables associated with the first and second actuator means may be located within the channel of the first arm.

4. The manipulator robot of claim 3 in which the first and second actuator means each comprise an actuator cylinder and piston driven within the cylinder under the influence of a pressurized fluid, and a pair of fluid lines coupled to the cylinder from a source and a tank of pressurized fluid, the pressurized fluid lines being positioned within the channel of the first arm.

5. The manipulator robot of claim 4 in which said fluid lines are coupled above the angular position transducer and through the apertures in the turret assembly and the base to the channel in the first arm.

* * * * *